Figure 1:
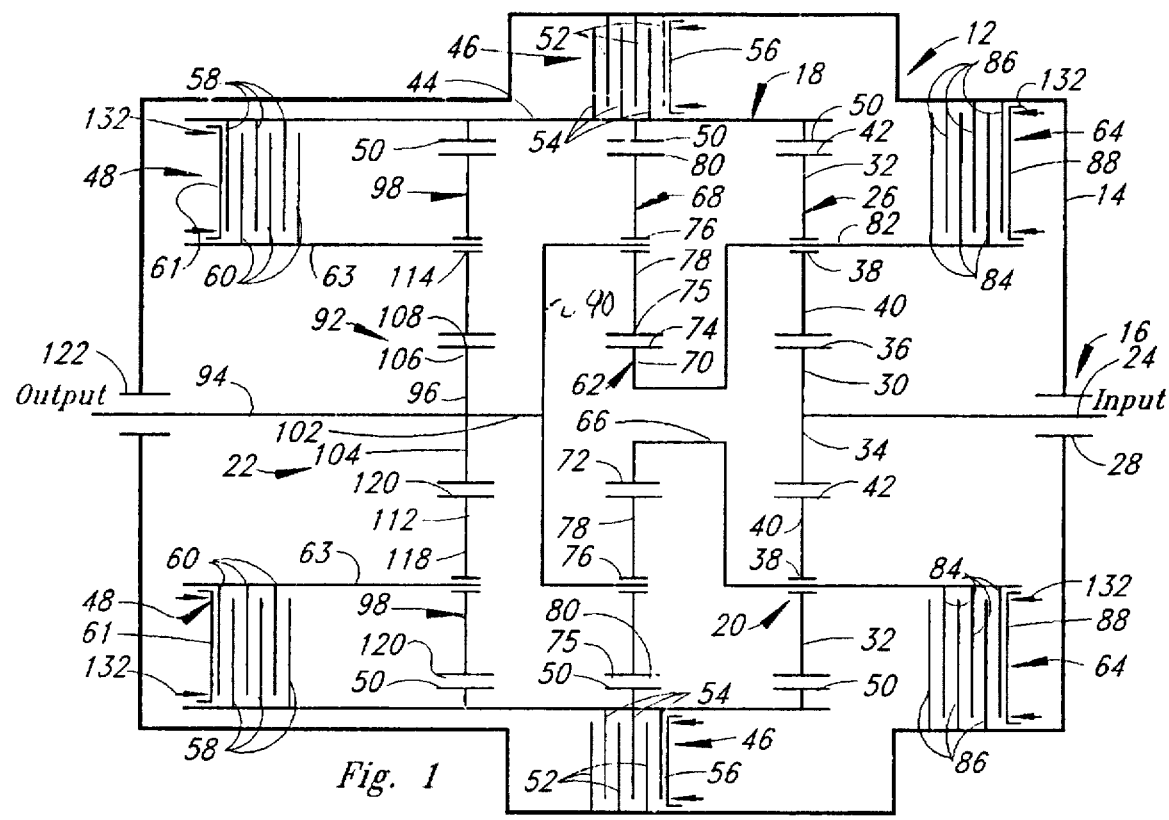

United States Patent [19]
Johnston

[11] Patent Number: 5,766,108
[45] Date of Patent: Jun. 16, 1998

[54] CONTINUOUSLY VARIABLE TRANSMISSION UTILIZING VARIABLE VISCOUS COUPLING

[76] Inventor: Thomas A. Johnston, 745 Palomar Ln., Colorado Springs, Colo. 80906

[21] Appl. No.: 437,021

[22] Filed: May 8, 1995

[51] Int. Cl.[6] .............................. F16H 48/26; F16H 3/62
[52] U.S. Cl. .................................. 475/91; 475/276
[58] Field of Search .......................... 475/91, 92, 275, 475/276, 279, 280, 281

[56] References Cited

U.S. PATENT DOCUMENTS

| | | | |
|---|---|---|---|
| 3,952,613 | 4/1976 | Iijima | 475/280 X |
| 4,747,464 | 5/1988 | Lanzer | 475/91 X |
| 5,030,180 | 7/1991 | Johnston | 475/91 |
| 5,165,308 | 11/1992 | Asada et al. | 475/276 X |

FOREIGN PATENT DOCUMENTS

| 76949 | 3/1990 | Japan | 475/276 |
|---|---|---|---|

*Primary Examiner*—Khoi Q. Ta
*Attorney, Agent, or Firm*—Phillip A. Rein

[57] ABSTRACT

A continuously variable transmission utilizing variable viscous couplings and power planetary gear sets having 1) a power input means; 2) a common ring gear means connected to the power input means; 3) a center planetary and reverse brake means connected to the common ring gear means; and 4) a power output means having a control planetary gear assembly mounted between a power output shaft and the common ring gear means. The power input means has an input planetary assembly connected to a power input shaft and operably connected to the common ring gear means. The center planetary and reverse clutch means includes a center planetary gear assembly connected to a reverse variable viscous brake to control operation in a reverse operation mode. The power input means includes a control planetary gear assembly operably connected to the common ring gear means and to a ratio variable viscous clutch to control operation in a drive range operation. A start variable viscous brake is connected to the common ring gear means to hold stationary during a low range start operation. The power planetary gear sets operate to achieve 1) a neutral operation when none of the viscous brakes or clutches are engaged; 2) a reverse operation when the reverse variable viscous brake is engaged; 3) an initial start or low range drive mode when the start variable viscous brake is engaged; and 4) a ratio variable viscous clutch is incrementally engaged and achieves maximum speed of the power output shaft when fully engaged.

25 Claims, 1 Drawing Sheet

5,766,108

1

CONTINUOUSLY VARIABLE TRANSMISSION UTILIZING VARIABLE VISCOUS COUPLING

PRIOR ART

A patent search was not conducted on this invention. The applicant herein has obtained a U.S. Pat. No. 5,030,180, issued Jul. 9, 1991, entitled "VARIABLE TRANSMISSION APPARATUS" and a second U.S. Pat. No. 5,299,985, issued Apr. 5, 1994, entitled "CONTINUOUSLY VARIABLE TRANSMISSION APPARATUS".

PREFERRED EMBODIMENT OF THE INVENTION

In one preferred embodiment of this invention, a continuously variable transmission utilizing variable viscous couplings, hereinafter referred to as continuously variable transmission, utilizes power planetary gear sets in combination with viscous clutch brake or coupling means utilized with a common ring gear means.

As noted in FIG. 1, the continuously variable transmission includes 1) a power input means; 2) a common ring gear means connected to the power input means; 3) a center planetary and reverse brake means connected to the power input means and the common ring gear means; and 4) a power output means operably connected to the common ring gear means and the center planetary and reverse clutch means.

The power input means includes a power input shaft rotatably driven by a power source such as an internal combustion engine and having an inner end connected to a planetary input assembly. The power input shaft is rotatably mounted on an input shaft bearing member.

The planetary input assembly includes an input sun gear member connected to and rotated by the power input shaft and input planet gear members operably engagable with the input sun gear member and the common ring gear means.

The input sun gear member includes a sun gear support body having outer sun gear teeth members which are engagable with the input planet gear members in a known conventional manner in the use of power planetary gear sets.

Each of the input planet gear members includes a central bearing member connected to a planet gear support body having planet gear teeth members on an outer periphery thereof which are engagable with the ring gear teeth members on the common ring gear means.

The common ring gear means includes 1) a common ring gear member operably engagable with all of three power plant gear sets as will be noted; 2) a start variable viscous brake or coupling which is engagable with the common ring gear member; and 3) a ratio variable viscous brake or coupling which is engagable with the common ring gear member.

The common ring gear member is provided with three spaced sets of interior ring gear teeth members which are engagable with spaced respective ones of three power planetary gear sets.

The start variable viscous brake is provided with 1) outer fixed brake plates which are secured to a transmission housing; 2) inner rotatable brake plates which are connected to the common ring gear member; and 3) a brake actuator piston member which is operable with viscous fluid to lock the inner fixed brake plates and inner rotatable brake plates to selectively cease rotation of the common ring gear member.

2

The ratio variable viscous brake is provided with 1) outer movable brake plates connected to the common ring gear member; 2) inner movable brake plates which are connected to a portion of the power output means; and 3) a ratio brake actuator piston member which acts variably with viscous fluid to selectively transfer power from the common ring gear member to the power output means.

The center planetary and reverse brake means includes 1) a center planetary gear assembly operably connected to a portion of the input planetary assembly of the power input means; and 2) a reverse variable viscous brake or coupling which is connected by an input carrier member to the center planetary gear assembly.

The center planetary gear assembly includes 1) a center hollow sun gear assembly; and 2) a center planet gear assembly operably connected to the center hollow sun gear assembly. The center hollow sun gear assembly includes a sun gear support body connected to a center sun gear member.

The center sun gear member has outer center sun gear teeth members thereon which are engagable with the center planet gear assembly in a known manner during use of power planetary gear sets.

The center planet gear assembly includes center planet gear members having outer center planet gear teeth members engagable with the center sun gear member and the common ring gear member.

The reverse variable viscous brake includes 1) reverse movable brake plates connected to the input carrier member; 2) reverse fixed brake plates connected to an adjacent portion of the transmission housing; and 3) a reverse brake actuator piston member operable in a known viscous fluid coupling to permit or cease rotation of the reverse movable brake plates.

The power output means includes 1) a center carrier member supported in bearing members in respective ones of the center planet gear members; 2) a control planetary gear assembly engagable with a portion of the common ring gear member and connected to the center carrier member; and 3) a power output shaft mounted in a bearing member and connected to the control planetary gear assembly.

The control planetary gear assembly includes a control sun gear assembly operably connected to a control planet gear assembly.

The control sun gear assembly includes a control sun gear member connected to the center carrier member by a sun gear shaft member and to the power output shaft member. The control sun gear member includes a control sun gear body member connected to outer peripheral control sun gear teeth members engagable with the control planetary gear assembly in a known manner during operation of a power planetary gear set.

The control planet gear assembly includes three (3) equally spaced control planetary gear members with each having a central bearing member. Each control planetary gear member has a support body member with peripheral control gear teeth members which are engagable with the control sun gear teeth members during conventional operation of a power planetary gear set.

Figure 2:
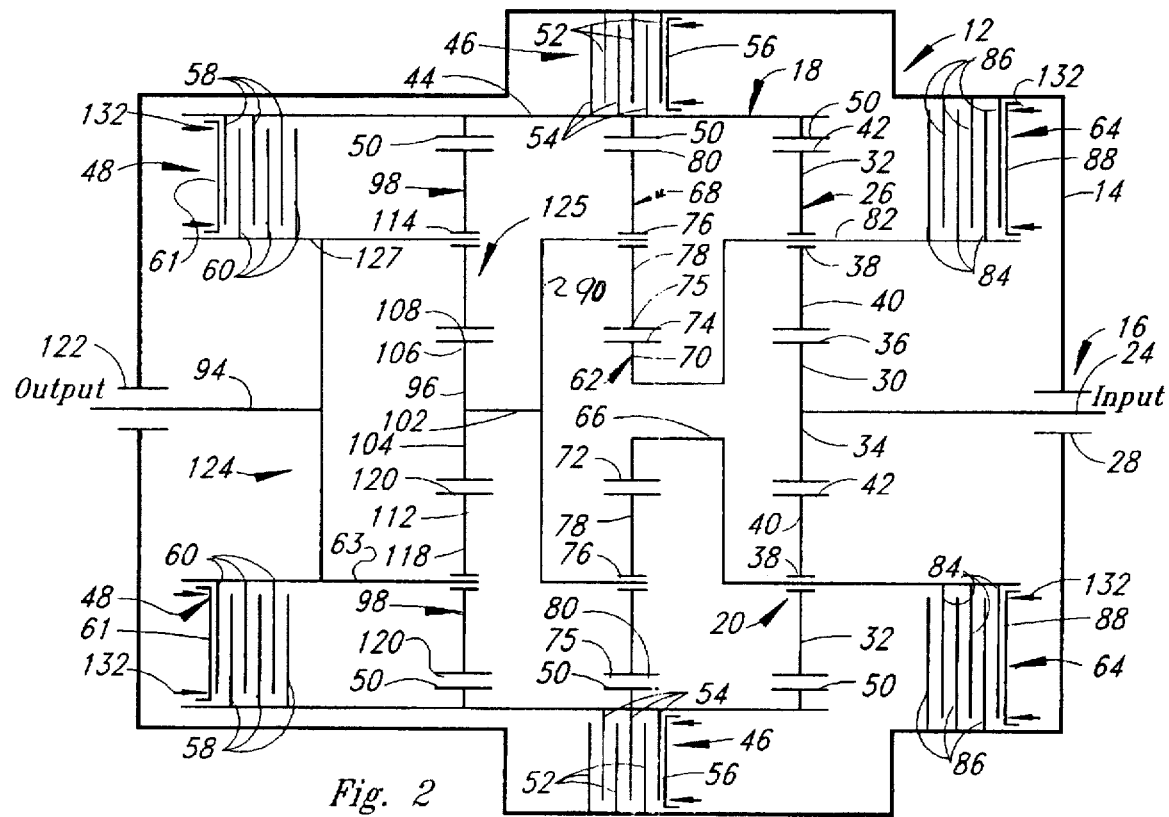

A second embodiment is noted in FIG. 2 and presents a heavy duty continuously variable transmission wherein the control planetary gear assembly of the first embodiment is replaced by an output planetary gear assembly.

The output planetary gear assembly includes 1) an output sun gear member; 2) a plurality of output planet gear members operably connected to the output sun gear member; and 3) an output carrier member. The output carrier member has one end mounted in the bearing members in respective ones of the output planet gear members and opposite ends connected to inner movable clutch plates of the ratio variable viscous clutch.

The power output means includes the power output shaft which is connected by a transverse support shaft or plate member connected to the output carrier member and not directly connected to the control sun gear body member as presented in the embodiment of FIG. 1.

OBJECTS OF THE INVENTION

One object of this invention is to provide a continuously variable transmission achieving a continuous power transmission output utilizing a plurality of variable viscous couplings in combination with a plurality of power planetary gear sets to achieve a continuously variable power output.

Another object of this invention is to provide a continuously variable transmission means utilizing an elongated common ring gear means which is connected through variable viscous brake couplings to respective units of power planetary gear sets to achieve a continuously variable power output.

One other object of this invention is to provide a continuously variable transmission utilizing 1) a reverse viscous brake connected to a power input means; 2) a start variable viscous brake engagable with a common ring gear member; and 3) a ratio variable viscous brake engagable with a power output means to achieve a fuel saving, efficient and effective continuously variable power output.

A further object of this invention is to provide a continuously variable transmission utilizing a start variable viscous brake or coupling means used to control rotation of a common ring gear means in a low range operation; a ratio variable viscous clutch or coupling means used to control operation of a control planetary gear assembly to achieve a continuously variable power output; and a reverse variable viscous brake or coupling means used to control operation of a central planetary gear assembly to achieve a reverse rotation.

One further object of this invention is to provide a second embodiment of a continuously variable transmission for heavy duty truck use having three (3) planetary gear sets, all cooperating to achieve a greater torque multiplication to a power output shaft.

Still, one other object of this invention is to provide a continuously variable transmission which is sturdy in construction; provided with a minimum amount of movable parts relative to power transmission apparatuses; utilizing a plurality of variable viscous clutch brake or coupling means, a common ring gear means, a plurality of spaced power planetary gear sets all engagable with the common ring gear means to achieve a fuel saving, efficient, continuously variable power output; and substantially maintenance free.

Various other objects, advantages, and features of the invention will become apparent to those skilled in the art from the following discussion, taken in conjunction with the accompanying drawings, in which:

FIGURES OF THE INVENTION

FIG. 1 is a schematic cross sectional view of a transmission housing and operating assembly utilizing a continuously variable transmission utilizing variable viscous couplings of this invention; and FIG. 2 is a schematic cross sectional view of the transmission housing and operating assembly utilizing a continuously variable transmission utilizing variable viscous couplings being a second embodiment of this invention.

The following is a discussion and description of preferred specific embodiments of the continuously variable transmission utilizing variable viscous couplings of this invention, such being made with reference to the drawings, whereupon the same reference numerals are used to indicate the same or similar parts and/or structure. It is to be understood that such discussion and description is not to unduly limit the scope of the invention.

DESCRIPTION OF THE INVENTION

On referring to the drawings in detail, and in particular to FIG. 1, a continuously variable transmission utilizing variable viscous couplings of this invention, indicated generally at 12, is operable to receive a power input supply, such as an internal combustion engine from a vehicle, and transfer this into a continuously variable power output supply.

The continuously variable transmission utilizing variable viscous couplings 12 is hereinafter referred to as "continuously variable transmission 12" and includes an outward enclosure or stationary transmission housing 14.

The continuously variable transmission 12 includes 1) a power input means 16; 2) an elongated common ring gear means 18 operably connected to the power input means 16; 3) a center planetary and reverse brake means 20 which is operably connected to the common ring gear means 18 and the power input means 16; and 4) a power output means 22 operably connected to the center planetary and reverse brake means 20 and the common ring gear means 18.

The power input means 16 includes a power input shaft 24 connected to an input planetary gear assembly 26. The power input shaft 24 is rotatably mounted within an input shaft bearing member 28.

The input planetary gear assembly 26 includes an input sun gear member 30 engagable with input planet gear members 32 for operation in a known conventional manner as a power planetary gear set. Power planetary gear sets can operate with one or a plurality of input planet gear members 32 but the use of three is normally preferred.

The input sun gear member 30 includes a sun gear support body 34 connected to the power input shaft 24 and having outer peripheral sun gear teeth members 36 thereon engagable with respective ones of the input planet gear members 32.

Each input planet gear member 32 includes 1) a central bearing member 38; 2) a planet gear support body 40; and 3) outer peripheral planet gear teeth members 42. The planet gear teeth members 42 are engagable with the sun gear teeth members 36 and further with a portion of the common ring gear means 18 for operation as to be described.

The common ring gear means 18 includes 1) a common ring gear member 44; 2) a start variable viscous brake or coupling means 46 with a portion thereof connected to the stationary transmission housing 14 and another portion connected to an outer portion of the common ring gear member 44; and 3) a ratio variable viscous brake or coupling means 48 having a portion thereof connected to the common ring gear member 44 and another portion connected to the power output means 22 for a variable power output in a manner to be explained.

The common ring gear member 44 is provided with three spaced sets of ring gear teeth members 50 for engagement with respective ones of power planetary gear sets as will be described. The sets of ring gear teeth members 50 could be a continuous integral ring abutting the ratio variable viscous brake 48.

The start variable viscous brake 46 includes 1) outer fixed brake plates 52 which are connected to an adjacent portion of the stationary transmission housing 14; 2) inner rotatable brake plates 54 which are connected to an outer surface of the common ring gear member 44 and rotatable therewith; and 3) a brake actuator piston member 56 which is operable to engage and disengage the outer fixed brake plates 52 and the inner rotatable brake plates 54 through use of a viscous fluid. The use and operation of a viscous clutch or brake coupling is well known in the prior art as a means for transferring power during a transmission operation.

The ratio variable viscous brake or coupling 48 includes 1) outer movable brake plates 58 which are secured to an inner surface and rotatable with the common ring gear member 44; 2) inner movable brake plates 60 which are secured to a portion of the power output means 22 and rotatable therwith in a disengaged condition; and 3) a ratio brake actuator piston member 61 which is operable to control rotation of the outer movable clutch plates 58 and the inner movable brake plates 60 from a disengaged to a partially engaged to an engaged or locked condition.

The operation of the ratio variable viscous brake 48 is known in the prior art utilizing a viscous fluid to achieve variable speed rotation between the outer movable clutch plates 58 the inner movable clutch plates 60.

The center planetary and reverse brake means 20 includes a center planetary gear assembly 62 connected to a reverse variable viscous brake or coupling 64.

The center planetary gear assembly 62 includes a center hollow sun gear assembly 66 operably engagable with a center planet gear assembly 68. The center hollow sun gear assembly 66 includes a center sun gear member 72 having a sun gear support body 70 provided with outer center sun gear teeth members 74 engagable with the center planet gear assembly 68.

The center planet gear assembly 68 includes a plurality of center planet gear members 75 thereof, each includes 1) a center bearing member 76; 2) a center planet support body 78; and 3) outer peripheral center planet gear teeth members 80.

Each set of respective center planet gear teeth members 80 are engagable with the sun gear teeth members 74 on the center sun gear member 72 and the ring gear teeth members 50 on the common ring gear member 44 in a known manner.

The reverse variable viscous brake 64 includes 1) a brake support input or input carrier member 82 connected to the sun gear support body 70 of the center sun gear member 72; 2) reverse movable brake plates 84 connected to the input carrier member 82; 3) reverse fixed brake plates 86 secured to an adjacent portion of the stationary transmission housing 14; and 4) a reverse brake actuator piston member 88 operable to selectively control a viscous coupling between the reverse movable brake plates 84 and the reverse fixed brake plates 86 in a manner known in the prior art with the use of viscous fluid brakes.

The power output means 22 includes 1) a planetary gear support member or center carrier member 90 having an outer portion thereof supported within respective ones of the center bearing members 76 of the center planet gear members 75 of the center planetary gear assembly 62; 2) a control planetary gear assembly 92 operably connected to the center carrier member 90 and adjacent ring gear teeth members 50 on the common ring gear member 44; and 3) an output shaft member 94 which is connected to the control planetary gear assembly 92.

The control planetary gear assembly 92 includes 1) a control sun gear assembly 96 which is connected to the center carrier member 90 and the output shaft member 94; and 2) a control planet gear assembly 98.

The control sun gear assembly 96 includes 1) a control sun gear shaft member 102 which is connected to the center carrier member 90 for conjoint rotation therewith; and 2) a control sun gear member 104 connected to the control sun gear shaft member 102 and the output shaft member 94.

The control sun gear member 104 is provided with a control sun gear support body 106 and having outer peripheral control sun gear teeth members 108 which are in engagement with portions of the control planet gear assembly 98.

The control planet gear assembly 98 includes control planetary gear members 112, each mounted on a respective bearing member 114 which are rotatably connected to the control carrier member 63.

Each control planetary gear member 112 is provided with a support body member 118 which is connected to outer peripheral control gear teeth members 120.

The control gear teeth members 120 are engagable with the control sun gear teeth members 108 of the control sun gear member 104 and further engagable with the ring gear teeth members 50 on the common ring gear member 44.

The control carrier member 63 has one portion supported in respective ones of the bearing members 114 and an outer end is connected to the inner movable brake plates 60 of the ratio variable viscous brake 48.

The output shaft member 94 is mounted within an output shaft bearing member 122 so as to be rotatable therein.

As shown in FIG. 2, a second embodiment of this invention for heavy duty use includes a continuously variable transmission utilizing variable viscous couplings 121 which is substantially identical to the first embodiment except having a different power output means 124 and the control planetary gear assembly 92 has been changed to an output planetary gear assembly 125.

More specifically, the continuously variable transmission 121 utilizes the previously described 1) power input means 16; 2) common ring gear means 18; and 3) center planetary and reverse clutch means 20. All of the elements therein have been described in the explanation of the first embodiment of FIG. 1.

The power output means 124 includes 1) an output planetary gear assembly 125; 2) an output carrier member 127 connected to the output planetary gear assembly 125; and 3) a transverse support member 128 connected to the output carrier member 127 and to the power output shaft 94.

The output planetary gear assembly 125 includes a sun gear member 104 connected to the power output shaft 94 and planet gear members 112 as previously described in the first embodiment.

The sun gear member 104 includes a sun gear support body 106 with sun gear teeth members 108 engagable with planet gear teeth members 120 of the planet gear members 112.

The output planetary gear assembly 125 operates in a torque multiplication function instead of a control function achieved by the control planetary gear assembly 92 in the first embodiment of FIG. 1.

USE AND OPERATION OF THE INVENTION

In the use and operation of the continuously variable transmission 12 of this invention as noted in FIG. 1, three power planetary gear sets in series are utilized with three viscous fluid coupling means to achieve the new and novel variable power output of this invention.

More specifically, the continuously variable transmission 12 utilizes three power planetary gear sets, namely, 1) the input planetary gear assembly 26; 2) the center planetary gear assembly 62; and 3) the control planetary gear assembly 92 all used in series with the common ring gear member 44.

The three power planetary gear sets 26, 63, 92 are utilized directly or indirectly with three variable viscous clutches, namely, 1) the start variable viscous brake 46; 2) the ratio variable viscous brake 48; and 3) the reverse variable viscous brake 64.

The continuously variable transmission 12 provides four modes or operations, namely, 1) neutral; 2) a fixed ratio reverse; 3) a fixed ratio low drive; and 4) a continuously variable drive range.

The following is a description of the operation in the various aforementioned four modes of operation.

NEUTRAL OPERATION—FIG. 1

In the neutral operation, the power input shaft 24 is connected to and rotates the input sun gear member 30 which rotates the input planet gear members 32 through engagement of the sun gear teeth members 36 and the planet gear teeth members 42.

The input carrier member 82 is held stationary due to a load on the output shaft member 94.

The input sun gear member 30 drives the input planet gear members 32 in a reverse direction. The input planet gear members 32 drive the common ring gear member 44 in a reverse direction as the start variable viscous clutch 46, the ratio variable viscous brake 48, and the reverse variable viscous brake 64 are disengaged. The common ring gear member 44 is freely rotated and no power is transmitted from the power input shaft 24 to the power output shaft 94.

REVERSE OPERATION—FIG. 1

In the reverse operation, the power input shaft 24 drives the input sun gear member 30 and interconnected input planet gear members 32. At this time, control fluid pressure is applied to the reverse variable viscous clutch 64, thus quickly closing to a fully engaged condition.

The input carrier member 82 is held against rotation by the engaged reverse variable viscous brake 64. The input sun gear member 30 then drives the input planet gear members 32 in reverse.

The input planet gear members 32 drive the common ring gear member 44 in reverse. Concurrently, the common ring gear member 44 drives the center planet gear members 75 about the center sun gear member 72 which is connected to the input carrier member 82 and held against movement by the reverse variable viscous clutch 64.

The rotating center planet gear members 75 then drive the center carrier member 90 and the attached power output shaft 94 in a direction reversed from the direction of rotation of the power input shaft 24 with a fixed torque increase depending on the size of gears utilized.

LOW RANGE OPERATION—FIG. 1

In the low range operation which is equivalent to a start up forward operation, the power input shaft 24 rotates the input sun gear member 30 and the input planet gear members 32. Controlled viscous fluid pressure is applied to the start variable viscous brake 46 through the brake actuator piston member 56 to variably and quickly close this brake to the engaged condition.

The common ring gear member 44 is held stationary by the start variable viscous brake 46. The rotating input planet gear members 32 react to the common ring gear member 44 being held against movement and rotates the input carrier member 82 forward with a torque multiplication.

The center planet gear member 75 is driven by the input carrier member 82 so that the center planetary gear assembly 62 repeats the action of the planetary input assembly 26 for a further torque increase. The power output shaft 94 is driven forwardly by the center carrier member 90 and the control planet gear members 112 are freewheeling about the common ring gear member 44

DRIVE RANGE OPERATION—FIG. 1

In the drive range operation, or known as a variable ratio forward range operation, when a vehicle having the continuously variable transmission 12 utilized therewith attains a maximum low speed range, the start variable viscous brake 46 is opened by releasing control fluid pressure on the brake actuator piston member 56. Concurrently, the ratio variable viscous clutch 48 is activated by applying a variable fluid pressure to the ratio brake actuator piston member 61.

The ratio variable viscous brake 48 controls the speed differential between the common ring gear member 44 and the control carrier member 63 thereby changing the speed differential between the power input shaft 24 and the power output shaft 94.

The range of torque multiplication is from the maximum, depending on relative sizes of the gears, generated by the power input shaft 24, the center planetary gear assembly 62, and the input planetary gear assembly 26 which are in series to the minimum of one to one.

The following is a description of the modes of operation of the second embodiment of the continuously variable transmission 121 as noted in FIG. 2.

NEUTRAL OPERATION—FIG. 2

In the neutral operation, the power input shaft 24 is connected to and rotates the input sun gear member 30 which rotates the input planet gear members 32 in a reverse direction through engagement of the sun gear teeth members 36 and the planet gear teeth members 42.

The input carrier member 82 rotates to drive the center sun gear member 72 which will rotate the center carrier member 90. This drives the output sun gear member 104 which, in turn, drives the output planet gear members 112.

The power output shaft 94 and interconnected transverse shaft member 128 are held stationary by a load on the power output shaft 94.

The input planet gear members 32 drive the common ring gear member 44 in a reverse direction as the start variable viscous brake 46, the ratio variable viscous brake 48, and the reverse variable viscous brake 64 are disengaged. The common ring gear member 44 is freely rotated and no power is transmitted from the power input shaft 24 to the power output shaft 94. The center planetary gear assembly 62 and the output planetary gear assembly 125 are freewheeling and not driving the power output shaft 94.

REVERSE OPERATION—FIG. 2

In the reverse operation, the power input shaft 24 drives the input sun gear member 30 and interconnected input planet gear members 32. At this time, a control fluid pressure is applied to the reverse variable viscous brake 64, quickly closing the subject brake to an engaged condition.

The input carrier member 82 is held against rotation by the closed reverse variable viscous brake 64. The input sun gear member 20 then drives the input planet gear members 32 in reverse.

The rotating input planet gear members 32 drive the common ring gear member 44 in reverse. Concurrently, the common ring gear member 44 drives the center planet gear assembly 68 or, specifically, the center planet gear members 75, about the center sun gear member 72 which is held stationary by the input carrier member 82 and the engaged reverse variable viscous brake 64.

The center planet gear members 75 then drive the center carrier member 90 and the attached output planetary gear assembly 125 including the output carrier member 127, the transverse output support member 128, and the power output shaft 94 in a reverse direction with a fixed torque increase depending on the size of the gears utilized.

LOW RANGE OPERATION—FIG. 2

In the description of the low range operation which is equivalent to a start up forward operation, the power input shaft 24 rotates the input sun gear member 30 and connected input planet gear members 32. Controlled fluid pressure is applied to the start variable viscous brake 46 through the clutch actuator piston member 56 to close this brake from a disengaged to a fully engaged condition.

The common ring gear member 44 is held stationary by the start variable viscous brake 46. The input sun gear member 30 drives the input planet gear members 32 which react to the common ring gear member 44 being held against movement. The input planet gear members 32 drive the input carrier member 82 forward with a torque multiplication.

The center hollow sun gear assembly 66 is driven by the input carrier member 82 so that the center planetary gear assembly 62 repeats the action of the input planetary assembly 26 for a further torque increase.

The output sun gear member 104 is driven by the output carrier member 127 which drives the output planet gear members 112 to repeat the action of the input planetary assembly 26 for a third torque increase. The rotational movement of the output carrier member 127 and interconnected transverse output support member 128 operate to drive the power output shaft 94 forwardly.

DRIVE RANGE OPERATION—FIG. 2

In the drive range operation, or known as a variable ratio forward range operation, when a vehicle having the continuously variable transmission 12 is utilized therewith attains a maximum low speed range, the start variable viscous brake 46 is opened by releasing the control fluid pressure on the brake actuator piston member 56. The ratio variable viscous clutch 48 is activated by applying a variable fluid control pressure to the ratio clutch actuator piston member 61.

The ratio variable viscous clutch 48 controls the speed differential between the common ring gear member 44 and the output carrier member 127 thereby changing the speed differential between the power input shaft 24 and the power output shaft 94.

The range of torque multiplication is from the maximum generated by 1) the power input shaft 24; 2) the input planetary assembly 26; 3) the center planetary gear assembly 62; and 4) the output planetary gear assembly 125, which are in a series, to the minimum of one to one.

The status and/or rotation of the major elements of the continuously variable transmission 12 in the modes of operation are indicated as follows:

FIG. 1 Chart

| Elements | Neutral Operation | Low Range Operation | Drive Range Operation | Reverse Operation |
|---|---|---|---|---|
| Power Input Shaft 24 | + | + | + | + |
| Input Sun Gear Member 30 | | | | |
| Input Carrier Member 82 Center Sun Gear Member 72 | + | + | + | Z |
| Center Carrier Member 90 Power Output Shaft 94 | Z | + | + | − |
| Control Carrier Member 63 | − | + | + | + |
| Common Ring Gear Member 44 | − | Z | + | − |
| Reverse Variable Viscous Brake 64 | D | D | D | E |
| Start Variable Viscous Brake 46 | D | E | D | D |
| Ratio Variable Viscous Clutch 48 | D | D | V | D |

Forward Rotation +
Reverse Rotation −
Zero Rotation  Z
Engaged        E
Disengaged     D
Variable       V

FIG. 2 Chart

| Elements | Neutral Operation | Low Range Operation | Drive Range Operation | Reverse Operation |
|---|---|---|---|---|
| Power Input Shaft 24 | + | + | + | + |
| Input Sun Gear Member 30 | | | | |
| Input Carrier Member 82 | + | + | + | Z |
| Center Carrier Member 90 Output Sun Gear Member 104 | + | + | + | − |
| Output Carrier Member 127 Power Output Shaft 94 | Z | + | + | − |
| Common Ring Gear Member 44 | − | Z | + | − |
| Reverse Variable Viscous Brake 64 | D | D | D | E |
| Start Variable Viscous Brake 46 | D | E | D | D |
| Ratio Variable Viscous Clutch 48 | D | D | V | D |

On reading the FIG. 1 power flow chart, the status and/or rotation of the major elements of the continuously variable transmission 12 are shown with the various symbols utilized to fully describe an operation of the continuously variable transmission 12.

In the neutral operation in the embodiment of the FIG. 1 chart, the power input shaft 24 the input sun gear member 30, the input carrier member 82 and center sun gear member 72 are rotated forwardly. The center carrier member 90 and the power output shaft 94 are in a condition of zero rotation due to a load on the power output shaft 94.

The control carrier member 63 and the common ring gear member 44 are in the condition of reverse rotation. At this time, the variable viscous brakes or clutches 46, 48, 64 are in a disengaged condition which causes a zero rotation in the power output shaft 94.

In the low range operation of the FIG. 1 chart, it is noted that the power input shaft 24, the input sun gear member 30, the input carrier member 82, the center sun gear member 72, the center carrier member 90, the power output shaft 94, and the control carrier member 63 are all in the condition of forward rotation. At this time, the common ring gear member 44 has zero rotation thereof.

The reverse variable viscous brake 64 is disengaged as with the ratio variable viscous clutch 48. The start variable viscous brake 46 is engaged which causes rotation of the power output shaft 94 in the low range operation.

In the drive range operation of the FIG. 1 chart, it is noted that the power input shaft 24, the input sun gear member 30, the input carrier member 82, the center sun gear member 72, the center carrier member 90, the power output shaft 94, the control carrier member 63, and the common ring gear member 44 are all in a forward rotation mode.

In this condition, the reverse variable viscous brake 64 and the start variable viscous brake 46 are in the disengaged condition. At this time, the ratio variable viscous clutch 48 is variably engaged so as to control drive speed output to the output shaft member 94.

On referring to the reverse operation in the FIG. 1 chart, it is noted that the power input shaft 24 and the input sun gear member 30 plus the control carrier member 63 are in the condition of forward rotation. The input carrier member 82 and the center sun gear member 72 are held at zero rotation.

The center carrier member 90 and the power output shaft 94 in conjunction with the common ring gear member 44 are in the condition of reverse rotation.

At this time, the reverse variable viscous brake 64 is in the engaged condition while, concurrently, the start variable viscous brake 46 and the ratio variable viscous brake 48 are in the disengaged condition.

On referring to the FIG. 2 chart, being the second embodiment of the invention, it sets forth that the rotation and condition of major elements during this mode of operation would be substantially identical to that in the first embodiment of FIG. 1.

The primary difference is connection of the power output shaft 94 to the third power planetary gear set or the output planetary gear assembly 125. In the first embodiment, the control planetary gear assembly 92 acts as a means of speed control, and in the second embodiment (FIG. 2), the output planetary gear assembly 125 operates as a third step of torque multiplication.

In the FIG. 2 chart, the center carrier member 90 is connected to and rotates with the output sun gear member 104 and not directly to the power output shaft 94. One additional change is the power output shaft 94 is connected to and rotates with the output carrier member 127.

It is noted that the continuously variable transmission 12 or 121 utilize three power planetary gear sets connected in a series in combination with three viscous fluid clutch or brake means, each associated with respective ones of the power planetary gear sets in combination with the common ring gear member 44 to achieve the continuously variable power output from the power input shaft 24 to the power output shaft 94.

This cooperation operates to achieve a smooth and variable transmission of power to the output shaft member 94 and operable to change conditions from a neutral condition; a low range condition; a drive range condition achieving a variable torque multiplication condition; and to a reverse condition.

The continuously variable transmission of this invention provides a continuously variable power output which is relatively economical to manufacture compared to prior art structures; reliable in use; operable to provide a variable degree of torque multiplication; providing various modes of operation such as neutral, low range, drive range or a reverse operation from a minimum of one to one to a maximum torque multiplication; and substantially maintenance free.

While the invention has been described in conjunction with preferred specific embodiments thereof, it will be understood that this description is intended to illustrate and not to limit the scope of the invention, which is defined by the following claims:

I claim:

1. A continuously variable transmission usable with a power supply system to transfer power from a power input shaft to a power output shaft, comprising:

a) a power input means including an input planetary gear assembly connected to a power input shaft to achieve rotation therefrom;

b) said input planetary gear assembly engagable with a common ring gear means and variably rotatable therewith;

c) a center planetary and reverse brake means having 1) a center planetary gear assembly engagable with said common ring gear means and having an input carrier member operably connected to said input planetary gear assembly; and 2) a reverse variable viscous brake connected to said input carrier member;

d) a power output means having a control planetary gear assembly connected to a power output shaft and by a center carrier member to said center planetary gear assembly;

e) said control planetary gear assembly having a portion variably engagable with said common ring gear means;

f) during neutral operation, 1) said reverse variable viscous brake is disengaged and said input planetary gear assembly is driven by said power input shaft and freewheeling about said common ring gear means; and 2) said power output shaft is held against rotation by a load thereon; and g) said center planetary gear assembly and said portion of said control planetary gear assembly are freewheeling about said common ring gear means.

2. A continuously variable transmission as described in claim 1, wherein:

a) during reverse operation, said reverse variable viscous brake is engaged to hold said input carrier member against rotation to cause said input planetary gear assembly to rotatably drive said common ring gear means which, in turn, drives said center planetary gear assembly and said center carrier member which rotates said power output shaft in a direction opposite said power input shaft.

3. A continuously variable transmission as described in claim 1, wherein:

13 a) said common ring gear means includes a start variable viscous brake connected thereto;

b) said start variable viscous brake engaged to hold said common ring gear means against rotation;

c) during a low range or start up operation, said reverse variable viscous brake is disengaged and said start variable viscous brake is engaged;

d) rotation of said power input shaft and said input planetary gear assembly rotates said input carrier member which, in turn, rotates said center planetary gear assembly; and e) rotation of said center planetary gear assembly and said center carrier member which is connected to and rotates said power output shaft.

4. A continuously variable transmission as described in claim 1, wherein:

a) said common ring gear means includes a ratio variable viscous brake having portions thereof connected to said common ring gear means and to a control carrier member which is connected to said control planetary gear assembly;

b) said ratio variable viscous clutch is engaged to variably connect said common ring gear means to said control carrier member;

c) during a drive range operation, said reverse variable viscous brake and said start variable viscous brake are disengaged and said ratio variable viscous clutch is variably engaged;

d) said power output shaft is rotatably driven by power through said power input means, said center planetary gear assembly, and said control planetary gear assembly; and e) said power output shaft is driven at a maximum ratio when said ratio variable viscous clutch is disengaged to a 1:1 power drive ratio when said ratio variable viscous clutch is fully engaged and said common ring gear means is locked for rotation with said control carrier member.

5. A continuously variable transmission usable with a power supply system to transfer power from a power input shaft to a power output shaft, comprising:

a) a power input means having a power input shaft connected to an input planetary gear assembly;

b) a common ring gear means operably connected to said input planetary gear assembly;

c) a center planetary and reverse brake means having a center planetary gear assembly operably connected to said common ring gear means, an input carrier member connected to said center planetary gear assembly and said input planetary gear assembly, and a reverse variable viscous brake connected to said input carrier member;

d) a power output means having a control planetary gear assembly operably connected to said common ring gear means, a center carrier member operably connected to said center planetary gear assembly, and a power output shaft connected to said control planetary gear assembly; and e) said common ring gear means includes a start variable viscous brake and a ratio variable viscous brake engagable with said control planetary gear assembly and selectively and variably engagable with said common ring gear means.

6. A continuously variable transmission as described in claim 5, wherein:

14 a) during neutral operation, said power input shaft rotates and drives said common ring gear means; and b) said control carrier member and said power output shaft are held against rotation by a load on said power output shaft and said reverse variable viscous brake, said start variable viscous brake, and said ratio variable viscous clutch are all in a disengaged condition with said input planetary gear assembly, said central planetary gear assembly, and said control planetary gear assembly are in freewheeling conditions.

7. A continuously variable transmission as described in claim 5, wherein:

a) during a reverse operation, said reverse variable viscous brake is engaged to hold said input carrier member and a portion of said center planetary gear assembly stationary, and 1) said start variable viscous brake and said ratio variable viscous brake are disengaged; 2) said input planetary gear assembly and said power input shaft rotate to drive said common ring gear means; 3) a portion of said center planetary gear assembly is rotatably driven by said common ring gear means which drives said center carrier member; and 4) said center carrier member is connected to said power output shaft which is rotated in a direction opposite to a rotational direction of said power input shaft.

8. A continuously variable transmission as described in claim 5, wherein:

a) during a low range start operation, said start variable viscous brake is engaged to hold said common ring gear means stationary, and 1) said reverse variable viscous brake and said ratio variable viscous clutch are disengaged; 2) said power input shaft rotates and drives said input planetary gear assembly and said input carrier member; and 3) said input carrier member rotates said center planetary gear assembly and said center carrier member which rotates said power output shaft.

9. A continuously variable transmission as described in claim 5, wherein:

a) during a drive range operation, said ratio variable viscous clutch is engaged to variably resist or lock a portion of said control carrier member against rotation, and 1) said start variable viscous brake and said reverse viscous brake are disengaged; 2) said power input shaft rotates and drives said input planetary gear assembly at a variable speed when said ratio variable viscous brake is not fully engaged; and 3) maximum output speed occurs when said ratio variable viscous brake is fully engaged and a portion of said ratio variable viscous brake is held against rotational movement relative to said common ring gear means.

10. A continuously variable transmission as described in claim 5, wherein:

a) during neutral operation, said power input shaft rotates said input planetary gear assembly and drives said common ring gear means, and 1) said control carrier member and said power output shaft are held against rotation by a load on said power output shaft and said reverse variable viscous brake, said start variable viscous brake, and said ratio variable viscous brake are all in a disengaged condition; and b) during a reverse operation, said reverse variable viscous brake is engaged to hold said input carrier member and a portion of said center planetary gear assembly stationary, and 1) said start variable viscous brake and said ratio variable viscous brake are disengaged; 2) said input planetary gear assembly and said power input shaft rotate to drive said common ring gear means; 3) a second portion of said center planetary gear assembly is rotatably driven by said common ring gear means; and 4) said second portion is connected by said center carrier member to said power output shaft which is rotated in a direction opposite to a rotational direction of said power input shaft.

11. A continuously variable transmission as described in claim 5, wherein;
   a) during neutral operation, said power input shaft rotates said input planetary gear assembly and drives said common ring gear means, and 1) said center carrier member and said power output shaft are held against rotation by a load on said power output shaft and said reverse variable viscous brake, said start variable viscous brake, and said ratio variable viscous brake are all in a disengaged condition; and
   b) during a reverse operation, a reverse variable viscous brake is engaged to hold said input carrier member and a portion of said center planetary gear assembly stationary, and 1) said start variable viscous brake and said ratio variable viscous brake are disengaged; 2) said input planetary gear assembly and said power input shaft rotate to drive said common ring gear means; 3) a second portion of said center planetary gear assembly is rotatably driven by said common ring gear means; and 4) said second portion is connected by said center carrier member to said power output shaft which is rotated in a direction opposite to a rotational direction of said power input shaft; and
   c) during a low range start operation, said start variable viscous brake is engaged to hold said common ring gear means stationary, and 1) said reverse variable viscous brake and said ratio variable viscous brake are disengaged; 2) said power input shaft rotates and drives said input planetary gear assembly and said input carrier member; and 3) said center carrier member rotates a portion of said center planetary gear assembly and said center carrier member which rotates said power output shaft.

12. A continuously variable transmission as described in claim 5, wherein:
   a) during neutral operation, said power input shaft rotates said input planetary gear assembly and drives said common ring gear means, and 1) said center carrier member and said power output shaft are held against rotation by a load on said power output shaft and said reverse variable viscous brake, said start variable viscous brake, and said ratio variable viscous clutch are all in a disengaged condition;
   b) during a reverse operation, said reverse variable viscous brake is engaged to hold said input carrier member and a portion of said center planetary gear assembly stationary, and 1) said start variable viscous brake and said ratio variable viscous brake are disengaged; 2) said input planetary gear assembly and said power input shaft rotate to drive said common ring gear means; 3) a second portion of said center planetary gear assembly is rotatably driven by said common ring gear means; and 4) said second portion is connected by said center carrier member to said power output shaft which is rotated in a direction opposite to a rotational direction if said power input shaft;
   c) during a low range start operation, said start variable viscous brake is engaged to hold said common ring gear means stationary, and 1) said reverse variable viscous brake and said ratio variable viscous brake are disengaged; 2) said power input shaft rotates and drives said input planetary gear assembly and said input carrier member; and 3) said center carrier member rotates a portion of said center planetary gear assembly and said center carrier member which rotates said power output shaft; and d) during a drive range operation, said ratio variable viscous clutch is engaged to variably resist or lock a portion of said control carrier member against rotation, and 1) said start variable viscous brake and said reverse variable viscous brake are disengaged; 2) said power input shaft rotates and drives said input planetary gear assembly at a variable speed when said ratio variable viscous brake is not fully engaged; and 3) maximum output speed occurs when said ratio variable viscous brake is fully engaged and a portion of said ratio variable viscous clutch is held against rotational movement relative to said common ring gear means.

13. A continuously variable transmission as described in claim 5, wherein:
   a) said reverse variable viscous brake includes reverse movable brake plates secured to said input carrier member, reverse fixed brake plates connected to a stationary transmission housing, and a reverse brake actuator piston member variably operable to cease rotation of said reverse movable brake plates and said common ring gear means during a reverse operation.

14. A continuously variable transmission as described in claim 5, wherein:
   a) said start variable viscous brake includes inner rotatable brake plates secured to said common ring gear means, outer fixed brake plates connected to a stationary transmission housing, and a start brake actuator piston member operable to cease rotation of said common ring gear means during a low range or start operation.

15. A continuously variable transmission as described in claim 5, wherein:
   a) said ratio variable viscous brake includes outer movable brake plates connected to said common ring gear means, inner movable brake plates connected to said control carrier member, and a ratio clutch actuator piston member variably operable to control relative rotation between said inner movable brake plates and said outer movable brake plates to control rotational speed from said power input shaft to said power output shaft.

16. A continuously variable transmission as described in claim 5, wherein:
   a) said input planetary gear assembly includes an input sun gear member connected to said power input shaft for rotation therewith, and input planet gear members rotatably connected to said input sun gear member and said common ring gear means;
   b) said input planet gear members rotatably connected to said input carrier member;
   c) said input planet gear members drive said common ring gear means when said reverse variably viscous brake is engaged and holds said input carrier member against rotation; and
   d) said common ring gear means rotates to drive said center planetary gear assembly and said power output shaft in a rotational direction opposite rotation of said power input shaft.

17. A continuously variable transmission as described in claim 5, wherein: a) said center planetary gear assembly includes a center sun gear member connected to said input carrier member for rotation therewith and center planet gear members connected to said center sun gear member and said common ring gear means;

b) said center planet gear members rotatably connected to said center carrier member; and c) said center carrier member rotates with said center sun gear member and said center planet gear members including said power output shaft when said start variable viscous brake is engaged and said common ring gear means is held against movement.

18. A continuously variable transmission as described in claim 5, wherein:

a) said control planetary gear assembly includes a control sun gear member connected to control planet gear members and said power output shaft; and a control carrier member connected to said control planet gear members and said control planet gear members are rotatably connected to said control sun gear member and said common ring gear means;

b) said ratio variable viscous brake connected to said control carrier member; c) said ratio variable viscous brake variably engaged to control relative rotational movement between said control carrier member and said common ring gear means; and d) said ratio variable viscous brake fully engaged to achieve a maximum rotation of said power output shaft from rotation of said power input shaft.

19. A continuously variable transmission apparatus usable with a power supply system to transfer power from an input shaft to an output shaft, comprising:

a) a power input means having a power input shaft connected to an input planetary gear assembly for rotation therewith;

b) a center planetary gear assembly operably connected to said input planetary gear assembly by an input carrier member;

c) an output planetary gear assembly connected to said center planetary gear assembly by a center carrier member;

d) a power output shaft connected by an output carrier member to said output planetary gear assembly;

e) a common ring gear means operably connected to said input planetary gear assembly, said center planetary gear assembly, and said output planetary gear assembly; and f) variable viscous clutch and brake means collectively operable to selectively, 1) hold said common ring gear means against rotation; 2) hold said input carrier member against rotation; and 3) variably resist movement of said output carrier member relative to said common ring gear means.

20. A continuously variable transmission as described in claim 19 in a neutral mode of operation, wherein:

a) said variable viscous clutch and brake means are disengaged to allow said input carrier member, said common ring gear means, and said output carrier member to freely rotate and said power output shaft is held by a load thereon; and b) said input planetary gear assembly, said center planetary gear assembly, and said output planetary gear assembly are freewheeling in a neutral mode of operation.

21. A continuously variable transmission as described in claim 19 in a reverse mode of operation, wherein:

a) said variable viscous clutch and brake means includes a reverse variable viscous brake operable during a reverse mode of operation to hold said input carrier member against rotation;

b) said common ring gear means is rotated by said input planetary gear assembly to drive said center planetary gear assembly and said center carrier member; and c) said center carrier member drives said output planetary gear assembly which, in turn, rotates said output carrier member and interconnected said power output shaft in a direction opposite to a rotational direction of said power input shaft.

22. A continuously variable transmission as described in claim 19 in a low range mode of operation, wherein:

a) said variable viscous brake and brake means includes a start variable viscous brake connected to said common ring gear means;

b) said start variable viscous brake operable during a low range mode of operation to hold said common ring gear means against rotation; and c) said power input shaft rotatably drives said input planetary gear assembly, said input carrier member, and said center planetary gear assembly, said center carrier member, and output planetary gear assembly, said output carrier member, and said power output shaft.

23. A continuously variable transmission as described in claim 19 in a drive range mode of operation, wherein:

a) said variable viscous brake means includes a ratio variable viscous brake means connected to said common ring gear means and said output carrier member;

b) said ratio variable viscous brake is variably closed to stop and control relative rotation between said common ring gear means and said output carrier member; and c) said power input shaft rotates to transfer power through said input planetary gear assembly, said input carrier member, said center planetary gear assembly, said center carrier member, said output planetary gear assembly, said output carrier member, and said power output shaft;

whereby torque multiplication and rotational speed from said power input shaft to said power output shaft is determined by amount of variable actuation of said ratio variable viscous clutch.

24. A continuously variable transmission usable with a power supply system to transfer power from a power input shaft to a power output shaft, comprising:

a) an input shaft connected to an input planetary gear assembly;

b) a common ring gear means operably connected to said input planetary gear assembly;

c) a variable brake assembly connected to an element of said common ring gear means;

d) a variable clutch assembly connected to said common ring gear means; and e) said variable brake assembly connected by a control planet gear assembly to an output shaft;

whereby said variable brake assembly operable to control speed rotation between said input shaft and said output shaft.

25. A continuously variable transmission as described in claim 24, including;

a) a center planetary and reverse brake means having a center planetary gear assembly operably connected to said common ring gear means, an input carrier member connected to said center planetary gear assembly and said input planetary gear assembly, and a reverse variable viscous brake connected to said input carrier member; and b) said common ring gear means includes a start variable viscous brake and a ratio variable viscous clutch.

* * * * *